US012747629B2

(12) United States Patent
Valkenburg

(10) Patent No.: US 12,747,629 B2
(45) Date of Patent: Sep. 29, 2026

(54) OPERATING DEVICE FOR A WINDOW COVERING

(71) Applicant: VAKO B.V., 's-Hertogenbosch (NL)

(72) Inventor: Nanne Willem Valkenburg, 's-Hertogenbosch (NL)

(73) Assignee: VAKO B.V., 's-Hertogenbosch (NL)

( * ) Notice: Subject to any disclaimer, the term of this patent is extended or adjusted under 35 U.S.C. 154(b) by 189 days.

(21) Appl. No.: 18/623,339

(22) Filed: Apr. 1, 2024

(65) Prior Publication Data

US 2025/0305356 A1 Oct. 2, 2025

(51) Int. Cl.
*E06B 9/326* (2006.01)
*E06B 9/303* (2006.01)
*E06B 9/322* (2006.01)

(52) U.S. Cl.
CPC .............. *E06B 9/326* (2013.01); *E06B 9/303* (2013.01); *E06B 9/322* (2013.01)

(58) Field of Classification Search
CPC ..... E06B 2009/3222; E06B 2009/2622; E06B 9/30; E06B 9/303; E06B 9/322; E06B 9/326; E06B 9/38; E06B 9/382; E06B 9/384; E06B 9/388
See application file for complete search history.

(56) References Cited

U.S. PATENT DOCUMENTS 2,086,461 A * 7/1937 Bogan .................... E06B 9/388 160/173 R
2,314,461 A * 3/1943 Schaefer ................ E06B 9/388 160/173 R
5,743,319 A * 4/1998 Christopherson ....... E06B 9/384 160/173 R
5,769,140 A * 6/1998 Tuzmen .................. E06B 9/305 160/178.3
6,119,757 A * 9/2000 Judkins .................. E06B 9/303 160/173 R
6,131,640 A * 10/2000 Judkins .................. E06B 9/388 24/130
8,365,795 B2 * 2/2013 Perkowitz ............... E06B 9/262 160/84.01
8,381,792 B2 * 2/2013 Perkowitz ............... E06B 9/262 160/84.01
8,857,493 B2 * 10/2014 Perkowitz ................ E06B 9/58 160/84.01

(Continued)

FOREIGN PATENT DOCUMENTS

CA 2581013 A1 * 9/2008 ............ E06B 9/384
CH 639725 A5 * 11/1983 ............ E06B 9/384

(Continued)

*Primary Examiner* — Johnnie A. Shablack
(74) *Attorney, Agent, or Firm* — Nath, Goldberg & Meyer; Joshua B. Goldberg

(57) ABSTRACT

The invention relates to an operating device for a window covering such as a Roman blind, pleated blind and/or a horizontal blind, comprising at least one carrying structure, at least one axially rotatable cord spool configured for winding up and unwinding at least one pull cord thereby lowering and/or raising a window covering, at least one drive shaft connected to the at least one cord spool, at least one pull cord connected to the drive shaft, at least one ladder cord configured for supporting at least part of the window covering. The invention is characterized in that movement of the pull cord relative to the ladder cord is restricted.

17 Claims, 7 Drawing Sheets

(56) References Cited

U.S. PATENT DOCUMENTS

Figure 1A:
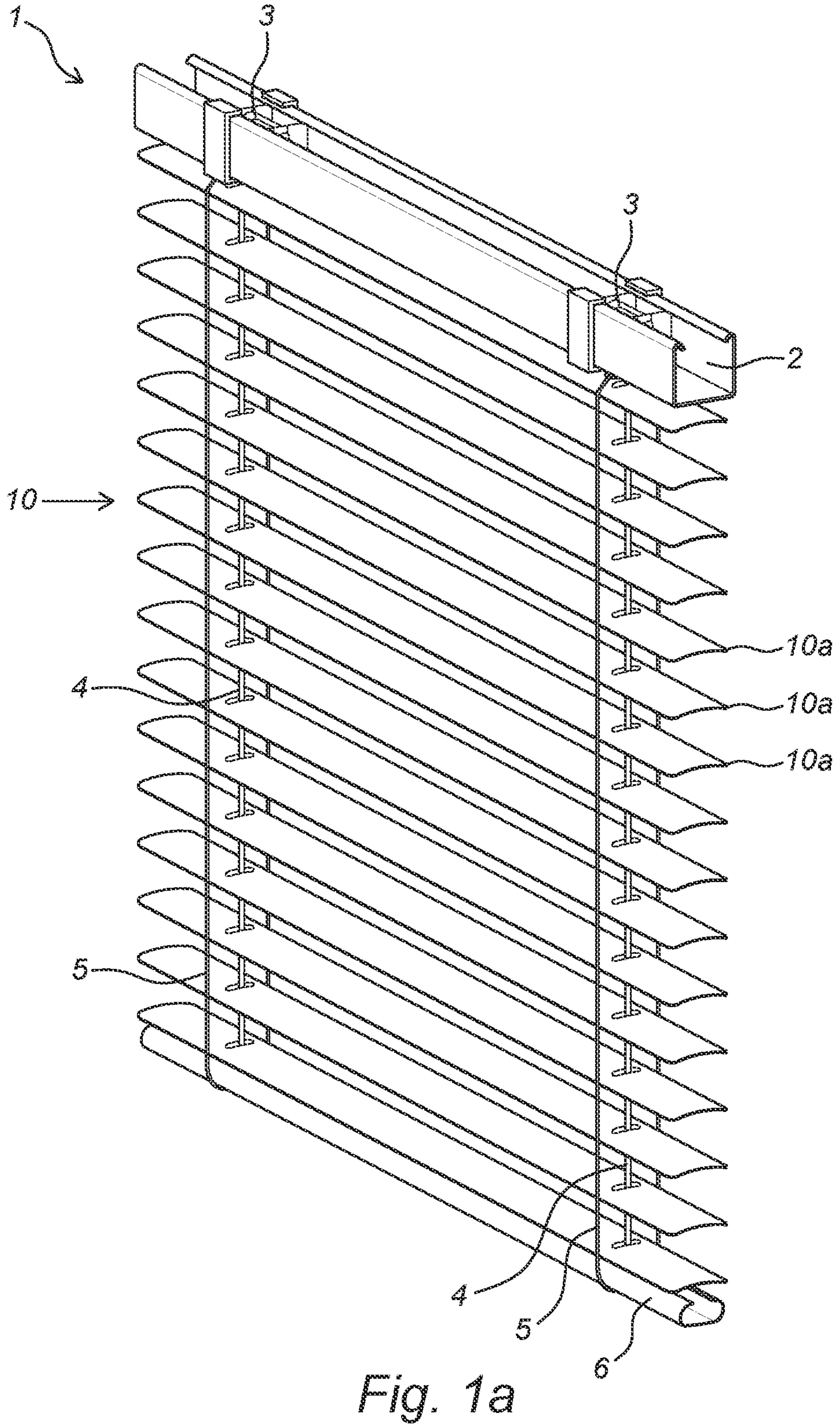

| | | | | |
|---|---|---|---|---|
| 11,525,300 | B1 * | 12/2022 | Huang | E06B 9/322 |
| 11,549,308 | B2 * | 1/2023 | Luo | E06B 9/384 |
| 11,866,992 | B2 * | 1/2024 | Kwak | E06B 9/308 |
| 11,873,681 | B2 * | 1/2024 | Pai | E06B 9/326 |
| 12,173,556 | B2 * | 12/2024 | Hsu | E06B 9/388 |
| 12,297,694 | B2 * | 5/2025 | Liang | E06B 9/327 |
| 2007/0158035 | A1 * | 7/2007 | Larsson | E06B 9/388 160/168.1 R |
| 2009/0294076 | A1 * | 12/2009 | McNiel | E06B 9/382 160/127 |
| 2012/0060329 | A1 * | 3/2012 | Zhang | E06B 9/388 24/115 F |
| 2013/0048233 | A1 * | 2/2013 | Lin | E06B 9/326 160/168.1 R |
| 2014/0048217 | A1 * | 2/2014 | Hsu | E06B 9/303 160/173 R |
| 2014/0284006 | A1 * | 9/2014 | Liang | E06B 9/303 160/178.1 R |
| 2018/0073295 | A1 * | 3/2018 | Nien | E06B 9/382 |
| 2018/0112460 | A1 * | 4/2018 | Huang | E06B 9/326 |
| 2018/0371830 | A1 * | 12/2018 | Nicolosi | E06B 9/303 |
| 2019/0112872 | A1 * | 4/2019 | Hsu | E06B 9/382 |
| 2021/0017813 | A1 * | 1/2021 | McCarty | E06B 9/304 |
| 2021/0032930 | A1 * | 2/2021 | Chen | E06B 9/382 |
| 2021/0317702 | A1 * | 10/2021 | Liang | E06B 9/384 |
| 2022/0356755 | A1 * | 11/2022 | Kirby | E06B 9/303 |
| 2023/0063464 | A1 * | 3/2023 | Chou | E06B 9/384 |
| 2023/0151683 | A1 * | 5/2023 | Chiang | E06B 9/382 160/178.3 |
| 2024/0151101 | A1 * | 5/2024 | Marocco | E06B 9/262 |
| 2025/0305356 | A1 * | 10/2025 | Valkenburg | E06B 9/303 |

FOREIGN PATENT DOCUMENTS

| | | | | | |
|---|---|---|---|---|---|
| DE | 202019104238 | U1 * | 8/2019 | | E06B 9/382 |
| DE | 202021105510 | U1 * | 10/2021 | | E06B 9/322 |
| KR | 20190060641 | A * | 6/2019 | | E06B 9/322 |
| WO | WO-2012087321 | A1 * | 6/2012 | | E06B 9/262 |

* cited by examiner

OPERATING DEVICE FOR A WINDOW COVERING

The invention relates to an operating device for a window covering such as a Roman blind, pleated blind and/or a horizontal blind. The invention also relates to such operating device and a window covering.

There are national and international regulations regarding the safety of window coverings in place in order to prevent injuries to people, and in particular children. The aim of these so-called child-safety regulations is, inter alia, to prevent children from suffocating as a result of becoming trapped in the loop of a cord or a chain. A known measure to meet these is the provision of a window covering in which the operating device is provided with a drive wheel provided with a cord or chain which is removably accommodated in a housing of the operating device. If excessive force is applied to the cord or the chain, and thus to the drive wheel, the cord or the chain will be removed from the housing, together with the drive wheel. By means of such a device, it is possible to prevent a child from becoming entangled with the cord and suffering serious injuries as a result. Another example to meet the child-safety regulation is by providing a cordless operating device for window shades or window blinds. Such cordless devices or systems can typically be operated manually controlled lifting and lowering of a bottom rail of the window shade or blind or via electrically controlled lifting and lowering of said window shade. However, also the cordless operating device could still have a cord construction configured to retain the window blind, for example a Roman blind or alternatively a honeyflex blind or vertical sheer.

It is an object of the invention to provide an improved operating device for a relatively child-safe window covering or at least to provide an alternative to the known operating device for (cordless) window coverings.

The invention provides thereto an operating device for a window covering such as a Roman blind, pleated blind and/or a horizontal blind, comprising: at least one carrying structure;

- at least one pull cord connected or connectable to a bottom rail of a window covering, wherein operating the pull cord enables lowering and/or raising of the bottom rail with respect to the carrying structure;
- at least one lifting element configured for guiding the pull cord at least during lowering and/or raising the window covering;
- at least one ladder cord configured for supporting at least part of the window covering;

wherein the operating device comprises a plurality of blocking elements, wherein at least one blocking element and preferably each blocking element at least engages or is attached to at least one pull cord such that movement of the pull cord relative to the ladder cord is restricted.

The operating device according to the present invention has several benefits over conventional operating devices for window coverings such as a Roman blind, pleated blind, horizontal blind, honeyflex blind and/or vertical sheer. The application of a plurality of blocking elements, wherein at least one blocking element and preferably each blocking element at least engages or is attached to at least one pull cord such that movement of the pull cord relative to the ladder cord is restricted prevents that the pull cord could get loosened thereby forming a loop. The formation of loops in the pull cord is highly undesirable as this could lead to strangulation danger for a child. Due to the blocking element (s) engaging and/or being attached to the at least one pull cord, the degree of freedom of the pull cord can be limited. The blocking elements are in particular configured to restrict the movement of the pull cord relative to the ladder cord and/or relative to the window covering. It is the pull cord who forms the biggest danger since this typically relatively long cord has to extend over the entire length of the window covering. The preset invention prevents that the pull cord can form a loop or multiple loops and can therefore provide a child-safe solution. The ladder cord benefits of its ladder configuration wherein the ladder beams and ladder rungs and the cooperation with the window covering prevent the ladder cord from loop formation. The blocking element(s) also positively contribute to that.

The operating device according to the invention could also be referred to as an operating mechanism. When it is referred to a pull cord also a lift string, lifting cord or pull string could be mentioned. When it is referred to a blind, also the term shade could be used. The ladder cord typically comprises a plurality of rungs which are positioned between two ladder beams. The ladder cord is typically substantially flexible. The pull cord is in particular connected to the drive shaft and configured for driving and thereby lowering and/or raising the window covering. The ladder cord, or ladder string, is in particular configured to support the window covering, and in particular the slats and/or window covering parts thereof. The ladder cord, or ladder string, can also be configured to allow slats or window covering parts of the window covering to rotate to let in. The carrying structure according to the present invention is in particular configured to accommodate at least part of the further components of the operating device, such as the drive shaft and/or drive wheels, if applied. When it is referred to carrying structure, also a housing could be meant.

The operating device according to the invention could optionally comprise at least one axially rotatable cord spool configured for lowering and raising, or winding up and unwinding, at least one pull cord thereby lowering and/or raising a window covering and in particular a bottom rail thereof. For such embodiment, the operating device preferably comprises at least one drive shaft connected to the at least one cord spool. It is also conceivable that the lifting element comprises at least one axially rotatable cord spool configured for lowering and raising (or winding up and unwinding) at least one pull cord thereby lowering and/or raising a window covering and preferably at least one drive shaft connected to the at least one cord spool. Alternatively, the lifting element can be configured to keep the pull cord in an unrolled configuration. The lifting element could also be referred to as winding mechanism.

The function of the blocking elements is to restrict movement of the pull cord in particular relative to the ladder cord and thus to prevent loop forming of the pull cord. It is in particular a goal to prevent loop formation wherein a loop larger than 30 cm, in particular larger than 20 cm and more in particular larger than 15 cm can be formed. It is in particular a goal to prevent loop formation wherein a loop larger than is 22 cm is formed. In order to ensure that loop formation is prevented over the entire length of the pull cord, it is preferred that at least two blocking elements are positioned at a predetermined distance from another over the length of the pull cord. Preferably, multiple blocking elements are positioned at a (predetermined) distance from another over the length of the pull cord. In this way, the plurality of blocking elements could be strategically positioned thereby ensuring that the degree of freedom of at least the pull cord is limited over different sections of said pull cord.

The ladder cord typically comprises a plurality of rungs which are positioned between two ladder beams. In a preferred embodiment, the device is configured such that two adjacent blocking elements enclose at least one rung of the ladder cord. It is also conceivable that two adjacent blocking elements enclose multiple rungs of the ladder cord. Depending on the further dimensions of the ladder cord and the window covering as such, it is for example imaginable that a blocking element is positioned at every other rungs of the ladder cord. It is for example also conceivable that at least one blocking element is positioned between two adjacent rungs of the ladder cord. In this way a relatively stable configuration is obtained wherein the pull cord is restricted substantially within the distance between the rungs.

In a preferred embodiment, at least one blocking element encloses at least part of at least one ladder cord, in particular at least part of a rung of the ladder cord. In this way, a co-action between the blocking element(s) and the ladder cord can be obtained. It is preferred that the blocking element encloses the rung instead of another part of the ladder cord, since enclosing the rung would be beneficial for the overall balance and/or stability of the configuration. The ladder cord could positively contribute to the positioning of the blocking element with respect to the pull cord. This is also beneficial as the ladder cord could also contribute to limiting the degree of freedom of the pull cord. It is in particular beneficial if at least one blocking element is attached to at least one pull cord and to at least one ladder cord, in particular to at least one rung of the ladder cord. In this way, the blocking element forms a fixation point for the pull cord and the ladder cord. This could not only lead to the prevention of loop formation, but could also positively contribute to a more stable configuration of the window covering as such.

Preferably, at least part of at least one blocking element is substantially flexible. Hence, it is for example conceivable that at least part of the blocking element is formed by a wire. It is also conceivable that the blocking element is a knotted wire. Hence, it is conceivable that the blocking element is a knotted wire which is attached to the pull cord and/or wherein the knotted wire encloses a rung of the ladder cord. It is imaginable that the knotted wire is not fixated to the ladder cord, and in particular the rung thereof, but that the knotted wire could freely slide over the rung of the ladder cord. It is preferred that the knotted wire is fixated with respect to the pull cord. It is also imaginable that at least one knotted wire, or multiple knotted wires are formed out of the pull cord. Hence, the blocking elements could form integral part of the pull cord. This results in an embodiment where there is no need for extra component and wherein the complexity can be reduced.

It is also imaginable that at least part of at least one blocking element is substantially rigid. At least one blocking element could for example be a button or button-like. At least one blocking element could for example be substantially flat. It is also possible that at least part of at least one blocking element follows the shape of at least part of the window covering. At least part of the blocking element could be substantially complementary to at least part of the window covering. In particular in case a relatively rigid window covering, such as wood and/or a rigid polymer, is applied, it is beneficial if the blocking element is configured to engage the window covering. A complementary shape could be beneficial for the stability of the overall configuration.

The shape of the blocking element could be adjusted based upon the window covering as applied and/or the types of pull cord and ladder cord as applied. Hence, it is conceivable that at least one blocking element is substantially round, square, oval, triangular, rectangular and/or a free form. Optionally, at least one blocking element is substantially flat. The blocking element preferably comprises at least one receiving space and/or through hole for receiving at least part of the pull cord.

In a preferred embodiment, the blocking element is configured such that at least part of at least one blocking element pierces through at least one pull cord. In this way a decent connection and/or cooperation between the blocking element and the pull cord can be obtained. Preferably the part of the blocking element which pierces the pull cord has a smaller width than the width of the pull cord. Optionally, at least one blocking element could be made of the same material as the ladder cord and/or the pull cord. It is also conceivable that at least one blocking element forms integral part of the pull cord. Hence, at least some of the blocking elements could be present in the form of knots made out of the pull cord. It is also conceivable that the pull cord comprises local bulges, nodes and/or protrusions which form blocking elements.

Preferably at least one blocking element substantially encloses at least one pull cord. It could herewith be prevented that the blocking element and the pull cord would get detached.

It is conceivable that the window covering forms part of the device according to the present invention. In a possible embodiment, at least one blocking element is attached to at least part of the window covering. In this manner, the blocking element could effectively restrict movement of the pull cord at a predetermined position. It is beneficial if the pull cord is restricted relative to the window covering as this could lead to a more controlled raising and lowering of the window covering.

In a preferred embodiment, at least part of at least one blocking elements extends in a direction away from the longitudinal direction of the pull cord. The blocking element could for example extend radially from the pull cord.

The device could also comprise at least one sleeve configured to at least partially enclose at least one pull cord. The use of a sleeve provides a protective function for the pull cord. It can al be said that at least one pull cord comprises a sleeve. At least part of the sleeve could for example comprise a knitted and/or braided structure. The sleeve could for example be a braided sheath. The sleeve could for example be a knitted sock. The sleeve could also positively contribute to the movement restriction of the pull cord with respect to the ladder cord. In case a sleeve is applied, the device according to the invention preferably comprises at least one connector for connecting at least one sleeve to the carrying structure. Preferably, the connector is at least partially resilient. It is also conceivable that at least part of the connector is resilient. At least part of the connector could for example comprise a spring. The spring could for example be a helical spring which preferably extends in the (vertical and/or longitudinal) direction of the pull cord. The connector could also be formed by a spring. Preferably, at least part of the connector is positioned substantially below at least one drive shaft. In this way could the connector positively contribute to accurate outlining of the sleeve with respect to the pull cord.

The invention also relates to an operating device for a window covering such as a horizontal blind, comprising at least one carrying structure, at least one pull cord directly or indirectly connected or connectable to a bottom rail of a window covering, wherein operating the pull cord enables lowering and/or raising of the bottom rail with respect to the carrying structure, at least one lifting element configured for guiding the pull cord at least during lowering and/or raising the window covering, wherein the operating device comprises a plurality of blocking elements, positioned along the length of the pull cord, which blocking elements, preferably each blocking element, cooperate between at least part of the pull cord and part of the window covering, such that movement of the pull cord relative to the window covering is restricted. Hence, it is conceivable that the blocking elements are applied in an embodiment which does not comprise a ladder cord. The same technical effect can be reached as the function of the blocking elements is to prevent movement of the pull cord relative to the window covering. It is in particular a goal to prevent loop formation wherein a loop larger than 30 cm, in particular larger than 20 cm and more in particular larger than 15 cm can be formed. It is in particular a goal to prevent loop formation wherein a loop larger than is 22 cm is formed. Any of the embodiments described above can apply to the embodiment without a ladder cord too.

The invention also relates to an assembly of a window covering, in particular a Roman blind, a pleated blind and/or a horizontal blind, and at least one operating device according to the present invention. Any of the described embodiment of the operating device according to the invention could be applied.

The window covering could also be a honeyflex blind and/or a vertical sheer. The window covering could for comprise a lower beam and/or an upper beam. Said beams could positively contribute to more controlled operation of the window blind. In a possible embodiment, at least one blocking element is attached to at least part of the window covering. In this manner, the blocking element could effectively restrict movement of the pull cord at a predetermined position. It is beneficial if the pull cord is restricted relative to the window covering as this could lead to a more controlled raising and lowering of the window covering. Typically, the window covering comprises multiple openings through which the pull cord is received. The openings are typically centrally located. It is beneficial if at least one opening, and preferably multiple or each opening of the window covering though which the pull cord is designed such that the blocking elements cannot pass through the opening. Hence, the smallest distance of a surface defined by at least one blocking element is preferably larger than the smallest distance of a surface defined by at least one opening of the window covering through which at least one pull cord is received.

It is beneficial if at least one blocking element is positioned a lower part of a slat or window covering part of the window covering. In this way, the window covering could form a protective function for the blocking element. It is also beneficial from aesthetic point of view if the window covering at least partially shields the blocking element(s).

The invention will be further elucidated based on the following non-limitative clauses.

1. Operating device for a window covering such as a horizontal blind, comprising:

at least one carrying structure;

at least one pull cord connected or connectable to a bottom rail of a window covering, wherein operating the pull cord enables lowering and/or raising of the bottom rail with respect to the carrying structure;

at least one lifting element configured for guiding the pull cord at least during lowering and/or raising the window covering;

at least one ladder cord configured for supporting at least part of the window covering;

wherein the operating device comprises a plurality of blocking elements, wherein at least one blocking element and preferably each blocking element at least engages or is attached to at least one pull cord such that movement of the pull cord relative to the ladder cord is restricted.

2. Operating device according to clause 1, wherein multiple blocking elements are positioned at a distance from another over the length of the pull cord.

3. Operating device according to any of the previous clauses, wherein two adjacent blocking elements enclose at least one rung of the ladder cord.

4. Operating device according to any of the previous clauses, wherein at least one blocking element is positioned between two adjacent rungs of the ladder cord.

5. Operating device according to any of the previous clauses, wherein at least one blocking element encloses at least part of at least one ladder cord, in particular at least part of a rung of the ladder cord.

6. Operating device according to any of the previous clauses, wherein at least one blocking element is attached to at least one pull cord and to at least one ladder cord, in particular to at least one rung of the ladder cord.

7. Operating device according to any of the previous clauses, wherein at least part of at least one blocking element is substantially flexible.

8. Operating device according to any of the previous clauses, wherein at least part of at least one blocking element is substantially rigid.

9. Operating device according to any of the previous clauses, wherein at least part of at least one blocking element pierces through at least one pull cord.

10. Operating device according to any of the previous clauses, wherein at least one blocking element encloses at least one pull cord.

11. Operating device according to any of the previous clauses, wherein at least one blocking element is made of the same material as the ladder cord and/or the pull cord.

12. Operating device according to any of the previous clauses, wherein at least one blocking element forms integral part of the pull cord.

13. Operating device according to any of the previous clauses, wherein at least part of at least one blocking elements extends in a direction away from the longitudinal direction of the pull cord.

14. Operating device according to any of the previous clauses, comprising at least one sleeve configured to at least partially enclose at least one pull cord.

15. Operating device according to any of the previous clauses, comprising at least one connector for connecting at least one sleeve to the carrying structure.

16. Operating device according to clause 15, wherein the connector is at least partially resilient.

17. Operating device according to clause 15 or 16, wherein at least part of the connector comprises a spring.

18. Operating device according to any of clauses 15 to 17, wherein at least part of the connector is positioned substantially below at least one drive shaft.

19. Operating device for a window covering such as a horizontal blind, comprising:

at least one carrying structure;

at least one pull cord directly or indirectly connected or connectable to a bottom rail of a window covering, wherein operating the pull cord enables lowering and/or raising of the bottom rail with respect to the carrying structure;

at least one lifting element configured for guiding the pull cord at least during lowering and/or raising the window covering;

wherein the operating device comprises a plurality of blocking elements, positioned along the length of the pull cord, which blocking elements, preferably each blocking element, cooperate between at least part of the pull cord and part of the window covering, such that movement of the pull cord relative to the window covering is restricted.

20. Operating device according to clause 19, wherein multiple blocking elements are positioned at a distance from another over the length of the pull cord.

21. Operating device according to clause 19 or 20, wherein at least part of at least one blocking element is substantially flexible.

22. Operating device according to any of clauses 19 to 21, wherein at least part of at least one blocking element is substantially rigid.

23. Operating device according to any of clauses 19 to 22, wherein at least part of at least one blocking element pierces through at least one pull cord.

24. Operating device according to any of clauses 19 to 23, wherein at least one blocking element encloses at least one pull cord.

25. Operating device according to any of clauses 19 to 24, wherein at least one blocking element is made of the same material as the pull cord.

26. Operating device according to any of clauses 19 to 25, wherein at least one blocking element forms integral part of the pull cord.

27. Operating device according to any of clauses 19 to 26, wherein at least part of at least one blocking elements extends in a direction away from the longitudinal direction of the pull cord.

28. Operating device according to any of clauses 19 to 27, comprising at least one sleeve configured to at least partially enclose at least one pull cord.

29. Operating device according to any of clauses 19 to 28, comprising at least one connector for connecting at least one sleeve to the carrying structure.

30. Operating device according to clause 29, wherein the connector is at least partially resilient.

31. Operating device according to clause 29 or 30, wherein at least part of the connector comprises a spring.

32. Operating device according to any of clauses 29 to 31, wherein at least part of the connector is positioned substantially below at least one drive shaft.

33. Operating device according to any of clauses 29 to 32, wherein the connector comprises a primary connector part and a secondary connector part wherein the sleeve is enclosed between the primary connector part and the secondary connector part.

34. Operating device according to any of clauses 29 to 33, wherein the primary connector part comprises multiple outwardly extending protrusions.

35. Assembly of a window covering, in particular a horizontal blind, and at least one operating device according to any of the previous clauses.

36. Assembly according to clause 35, wherein at least one blocking element is attached to at least part of the window covering.

37. Assembly according to clause 35 or 36, wherein at least one blocking element is positioned a lower part of a slat or window covering part of the window covering.

Figure 1B:
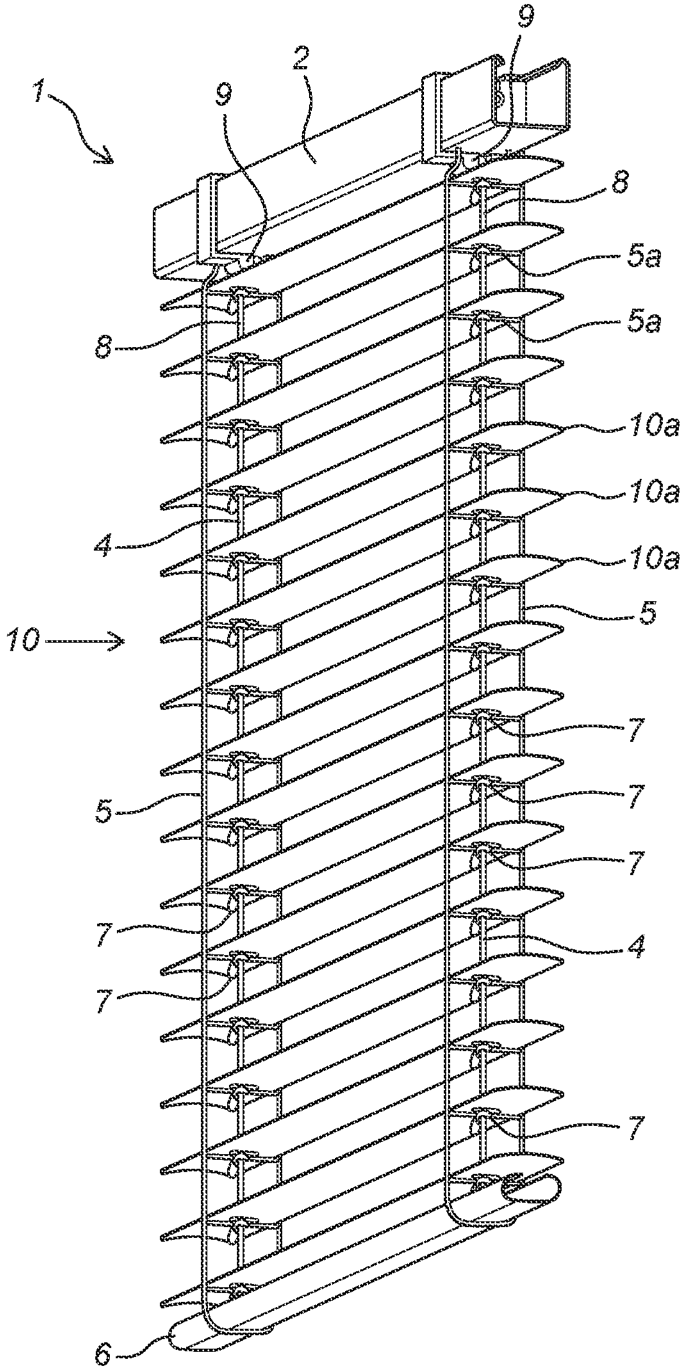
Figure 2:
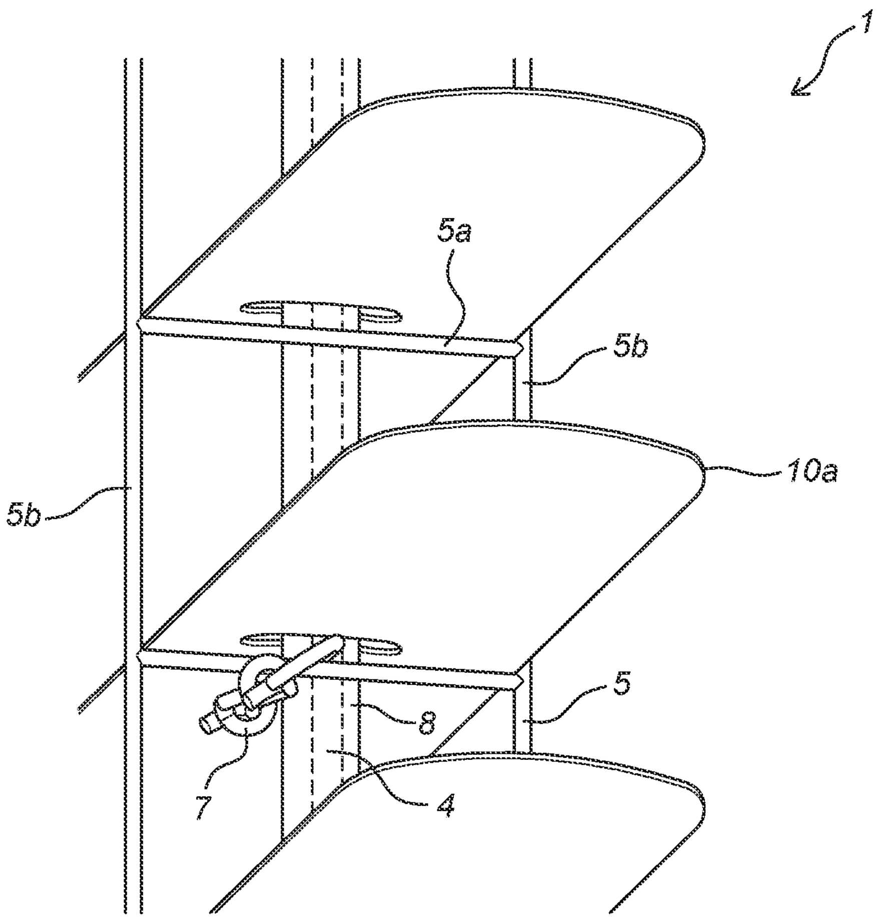
Figure 3A:
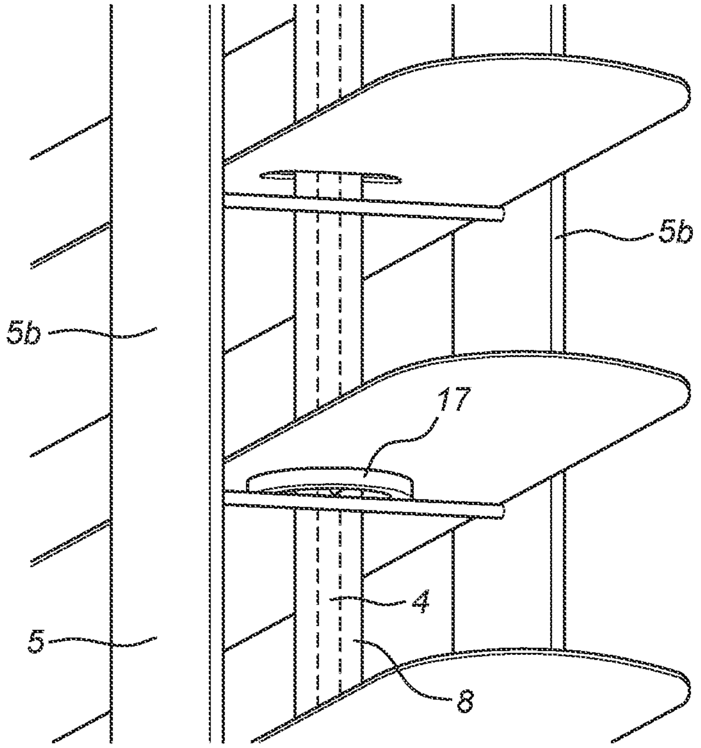
Figure 3B:
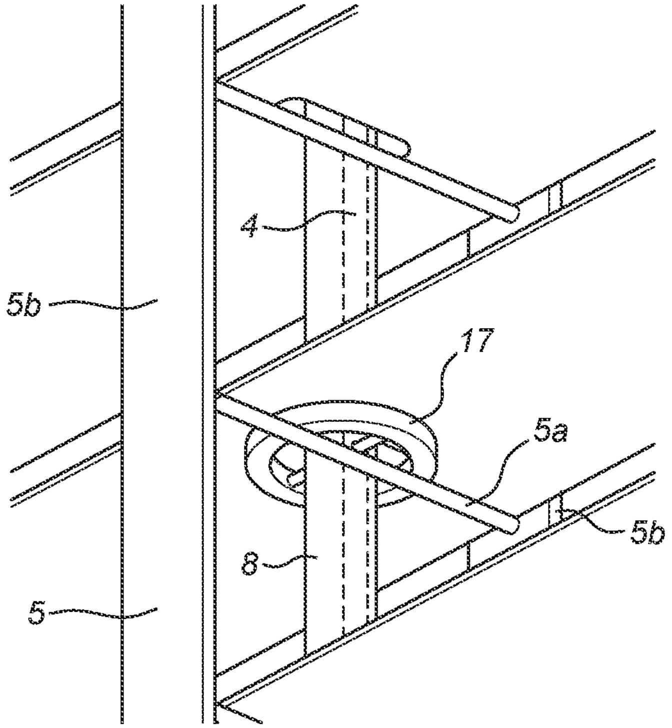
Figure 4:
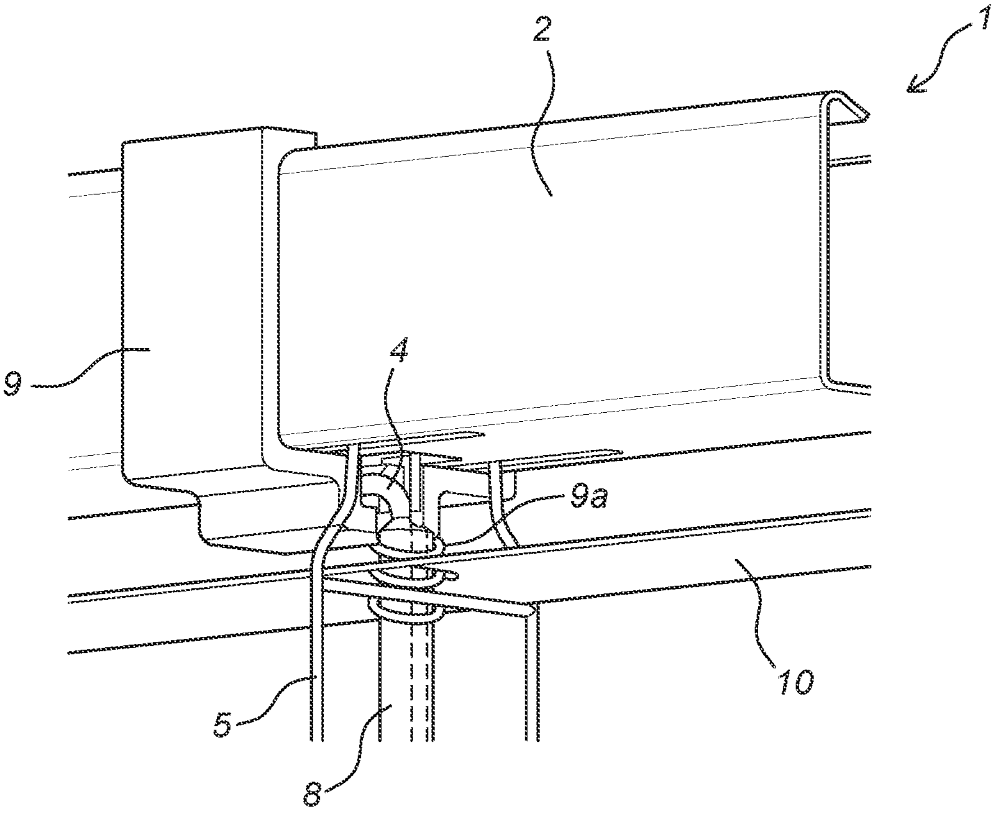
Figure 5A:
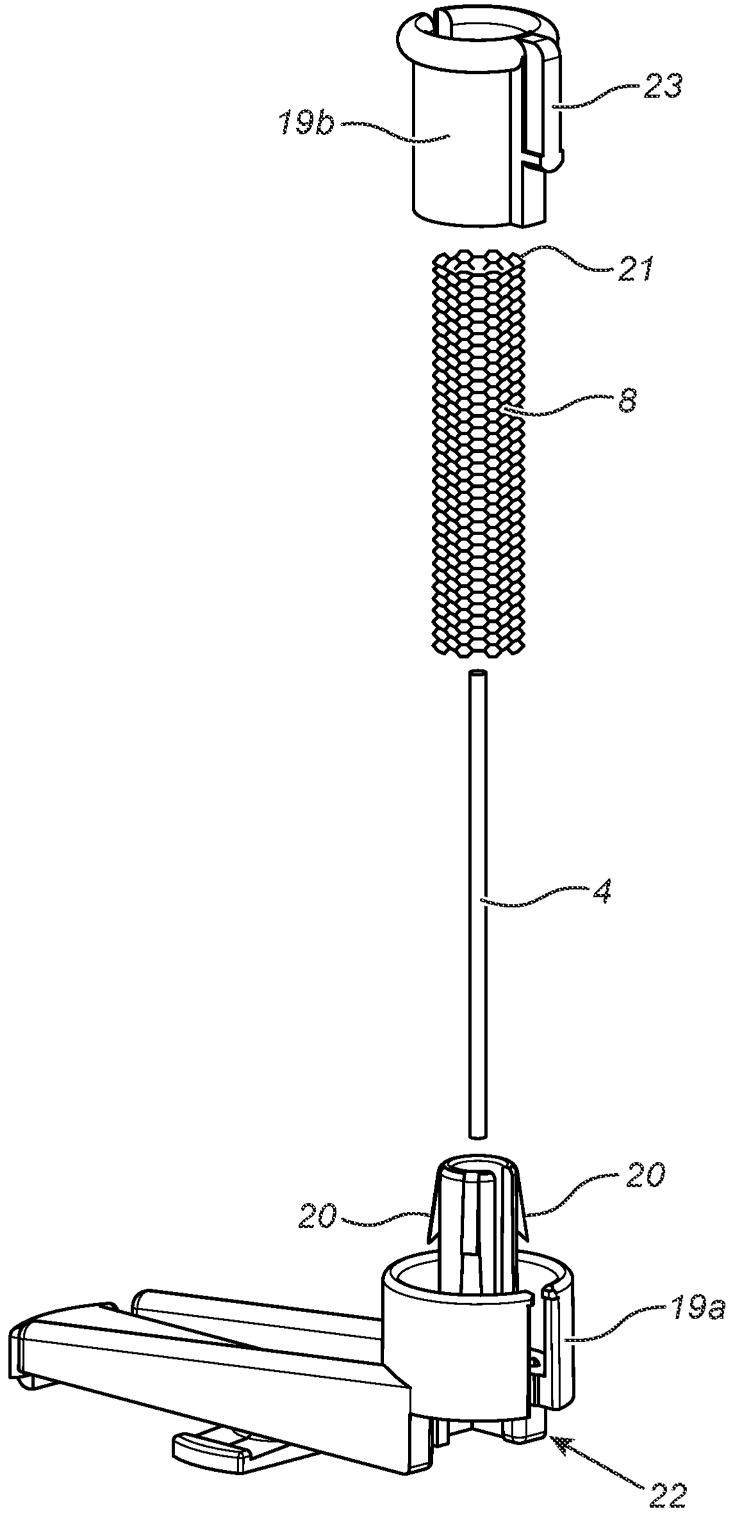
Figure 5B:
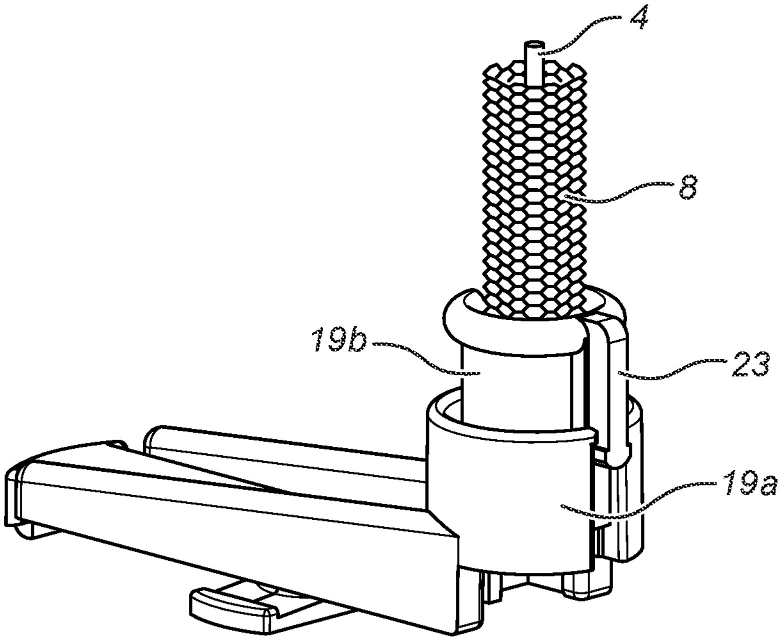
Figure 5C:
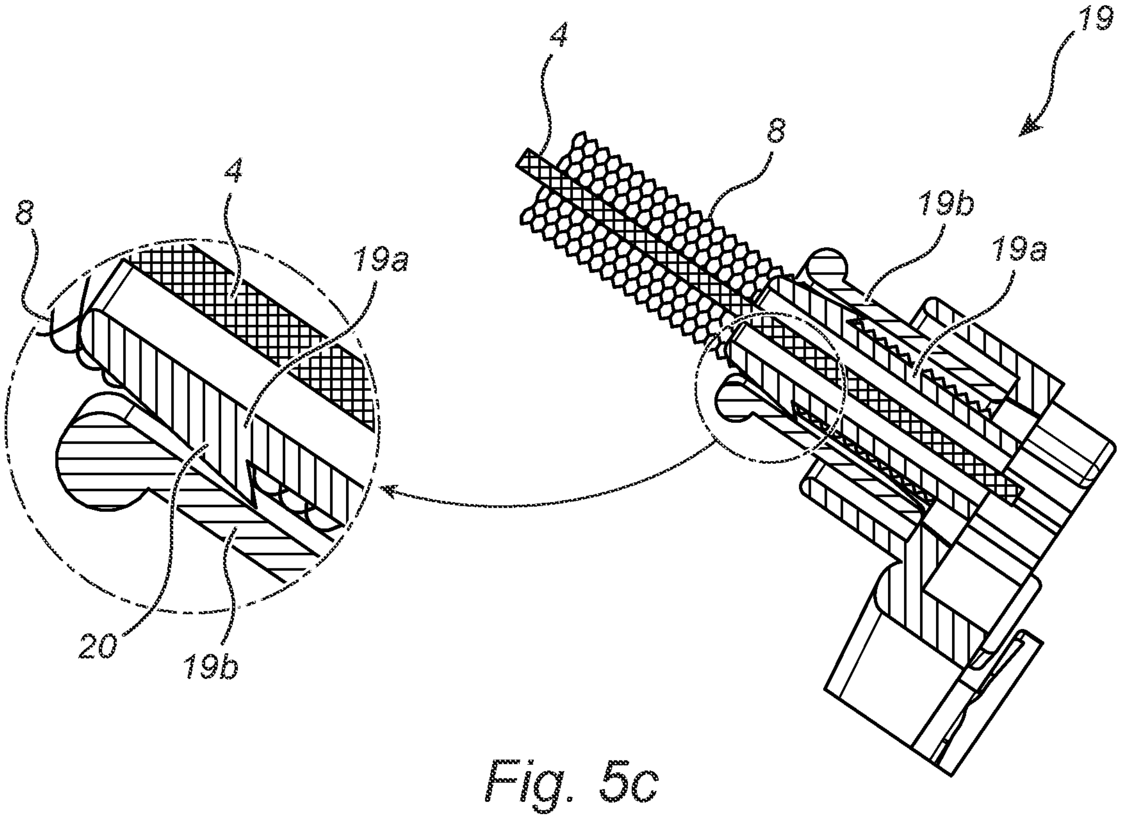

The invention will be further elucidated by means of non-limiting exemplary embodiments illustrated in the following figures, in which:

FIGS. 1*a* and 1*b* show a schematic representation of a first possible embodiment of an operating device according to the present invention;

FIG. 2 shows a first possible example of a blocking element for use in an operating device according to the invention;

FIGS. 3*a* and 3*b* show a second possible embodiment of a blocking element for use in an operating device according to the invention;

FIG. 4 shows a detailed view of part of an operating device according to the invention; and FIGS. 5*a*, 5*b* and 5*c* show a further possible embodiment of part of a connector of an operating device according to the invention.

Within these figures, similar reference numbers correspond to similar or equivalent elements or features.

FIGS. 1*a* and 1*b* shows a possible embodiment of an operating device 1 for a window covering according to the present invention. The figures in particular shown an assembly of a window covering 10 and an operating device 1 according to the invention. In the shown embodiment, the window covering 10 comprises a plurality of slats 10*a* which are operable via the operating device 1. FIGS. 1*a* and 1*b* each show a perspective view of the assembly.

The operating device 1 is in particular configured for operating a window covering such as a Roman blind, pleated blind and/or a horizontal blind. The operating device 1 as shown comprises a carrying structure 2, a plurality of lifting elements 3, in particular axially rotatable cord spools 3 wherein each cord spool 3 is configured for winding up and unwinding a pull cord 4 thereby lowering and/or raising a window covering 10. The device also comprises a plurality of ladder cords 5 configured for supporting at least part of the window covering 10. In the shown embodiment, the pull cords 4 are connected to a beam 6 which could also be lowered and raised via the pull cords 4. The pull cord 4 extends though through holes present in the window covering 10. The ladder cord 5 encloses the window covering parts. The device 1 further comprises a drive shaft connected to the cord spools 3. The operating device 1 further comprises a plurality of blocking elements 7. In the shown configuration is each blocking element 7 attached to a pull cord 4 such that movement of the pull cord 4 relative to the ladder cord 5 is restricted. More specifically, the blocking elements 7 enclose part of the ladder cord 5, in particular part of a rung 5*a* of the ladder cord 5. The blocking elements 7 are attached to both a pull cord 4 and a ladder cord 5, thereby ensuring restriction of movement of the pull cord 4 with respect to the ladder cord 5 in an efficient manner. In the shown embodiment, multiple blocking elements 7 are positioned at a distance from another over the length of the pull cord 4. In particular, between each slat 10*a* of the covering 10 a blocking element 7 is positioned. The blocking elements 7 enclose the pull cord 4 to which they are connected. In the embodiment shown, each blocking elements 7 is present in the form of a knotted wire. The blocking elements 7 of the present embodiment are substantially flexible. The device 1 further comprises sleeves 8 configured to at least partially enclose a pull cord 4. The sleeves 8 are connected via a connector 9 to the carrying structure 2. The optional sleeve 8 and connector 9 are shown in more detail in FIG. 4. In the shown embodiment, the device 1 is configured for cordless operation of the window covering 10.

FIG. 2 shows a detailed view of a blocking element 7 according to the invention as applied in the embodiment of the operating device 1 according to the invention as shown in FIGS. 1*a* and 1*b*. The figure shows a ladder cord 5, having rungs 5*a* which extend between two vertically extending ladder beams 5*b* and a pull cord 4. The pull cord 4 is enclosed by a sleeve 8. An upper part of the figure shows the situation wherein no blocking element is applied, hence, the pull cord 4 can freely move relative to the ladder cord 5. The bottom part of the figure shows the presence of a blocking element 7, which is pierced through the pull cord 4 and which connects the pull cord 4 and the ladder cord 5 together. Free movement of the pull cord 4 is not possible anymore since the blocking element 7 will form a restrictive boundary for the pull cord 4. This is in particular the successful in case multiple blocking elements 7 are periodically located over the length of the pull cord 4, for example as shown in FIGS. 1*a* and 1*b*. The blocking element 7 is positioned below a lower side of a slat 10*a*. This is beneficial from aesthetic point of view, since the slats 10*a* basically cover the blocking elements 7.

FIGS. 3*a* and 3*b* show yet another possible embodiment of a blocking element 17 according to the present invention configured for use in an operating device according to the invention. Each figure shows a perspective view, wherein it is focused on the blocking element. An upper part of the figure shows the situation wherein no blocking element is applied, hence, the pull cord 4 can freely move relative to the ladder cord 5. The bottom part of the figure shows the presence of a blocking element 17, which is pierced through the pull cord 4 and which forms a boundary for the pull cord 4 such that movement of the pull cord 4 with respect to the ladder cord 5 is restricted. In the shown embodiment, the blocking element 17 is substantially rigid and part of the blocking element pierces 17 through the pull cord 4. The blocking element 17 is attached to part of the window covering 10, in particular to a slat 10*a* thereof. The figure shows that the blocking element 17 is configured such that the blocking element 17 cannot be displaced through the opening of the slat 10*a* since the rigid and configuration and shape of the blocking element 17 prevent it therefrom. The blocking element 17 is positioned a lower part of a slat 10*a* or window covering part 10*a* of the window covering 10. The blocking element 17 is not attached to the ladder cord 5. The blocking element 17 engages the blocking element 17 in the shown configuration. Part of the blocking element 17 extends in a direction away from the longitudinal direction of the pull cord 4. The ladder cord 5 as shown is in particular a ladder band 5, having relatively wide ladder beams 5*b* in combination with ladder rungs 5*a*.

FIG. 4 shows a detailed view of part of an embodiment of an operating device 1 according to the present invention, in particular a detailed view of the embodiment as shown in FIGS. 1*a* and 1*b*. The operating device 1 as shown comprises a carrying structure 2, a plurality of lifting elements (not shown) configured for lowering and raising a pull cord 4 thereby lowering and/or raising a window covering 10. The device 1 also comprises a plurality of ladder cords 5 configured for supporting at least part of the window covering. The device 1 further comprises a sleeve 8 configured to at least partially enclose the pull cord 4. It may also be said that the pull cord 4 comprises a sleeve 8. The sleeve 8 as shown is for example a (braided) sheath 8. The device 1 comprises a connector 9 for connecting the sleeve 8 to the carrying structure 2. It is undesirable to attach the sleeve 8 to a cord spool, if applied, as winding up of the sleeve 8 and the pull cord 4 over the cord spool could lead to a bulky and/or tangled situation. Hence, the sleeve 8 is connected separately from the pull cord 4. In the shown embodiment, at least part of the connector 9 is resilient. The resilient character of the connector 9 enables that large pulling forces on the sleeve can be prevented. A too large pulling force on the sleeve 8 could lead to damaging thereof and/or to disconnection of the connector 9 and the sleeve 8. In the shown embodiment, the connector 9 comprises a spring 9*a*. The spring 9*a* is configured for attaching and/or guiding the sleeve 8 in an efficient and controlled manner. Part of the connector 9 is positioned substantially below the drive shaft.

FIGS. 5*a*, 5*b* and 5*c* show a further possible embodiment of part of an operating device according to the invention. The figures show in particular an alternative embodiment of a connector 19 according to the present invention. FIG. 5*a* shows an exploded view of the connector 19, FIG. 5*b* shows the connector 19 in an assembled configuration and FIG. 5*c* shows a cross sectional view of the connector 19 and a detailed part thereof. The figures show that the connector 19 co-acts with a sleeve 8 which sleeve 8 at least partially encloses the pull cord 4. It may also be said that the pull cord 4 comprises a sleeve 8. The connector 19 is configured for connecting the sleeve 8 to a carrying structure. The connector 19 as shown is a modular connector 19 comprising multiple connector parts 19*a*, 19*b*. The primary connector part 19*a* comprises protrusions 20, in particular barbs 20, which are configured to retain at least part of the sleeve 8. The barbs/protrusions 20 extend outwardly. The sleeve 8 could for example comprises holes for co-action with the protrusions. In case the sleeve 8 is formed by a braided sheath, the holes of the braided structure 21 could provide the co-actions with the protrusions 20 of the primary connector part 19*a*. The connector 19 further comprises a secondary connector part 19*b* which is configured for co-action with the primary connector part 19*a*. The secondary connector part 19*b* at least partially encloses the primary connector part 19*a*. In the shown embodiment, in the assembled configuration, the sleeve 8 is enclosed between the primary connector part 19*a* and the secondary connector part 19*b*. The primary connector part 19*a* further comprises a slit 22 in which is configured to receive a projection 23 of the secondary connector part 19*b*. The protrusions 20, or barbs 20, could engage an inner side of the secondary connector part 19*b* in the shown configuration. The cord 4 can be led through the connector 19, and thus through the sleeve 8 received therein. The connector parts 19*a*, 19*b* are preferably substantially rigid.

It will be clear that the invention is not limited to the exemplary embodiments which are illustrated and described here, but that countless variants are possible within the framework of the attached claims, which will be obvious to the person skilled in the art. In this case, it is conceivable for different inventive concepts and/or technical measures of the above-described variant embodiments to be completely or partly combined without departing from the inventive idea described in the attached claims.

The verb 'comprise' and its conjugations as used in this patent document are understood to mean not only 'comprise', but to also include the expressions 'contain', 'substantially contain', 'formed by' and conjugations thereof.

The invention claimed is:

1. An operating device for a window covering such as a horizontal blind, comprising:

at least one carrying structure;

at least one pull cord connected or connectable to a bottom rail of a window covering, wherein operating the pull cord enables lowering and/or raising of the bottom rail with respect to the carrying structure;

at least one lifting element configured for guiding the pull cord at least during lowering and/or raising the window covering;

at least one ladder cord configured for supporting at least part of the window covering;

at least one sleeve configured to at least partially enclose the at least one pull cord; and at least one connector for connecting the at least one sleeve to the carrying structure, wherein the operating device comprises a plurality of blocking elements, wherein at least one blocking element at least engages or is attached to at least one pull cord such that movement of the pull cord relative to the ladder cord is restricted; and wherein the connector comprises a primary connector part and a secondary connector part wherein the sleeve is enclosed between the primary connector part and the secondary connector part.

2. The operating device according to claim 1, wherein the plurality of blocking elements are positioned at a distance from another over the length of the pull cord.

3. The operating device according to claim 1, wherein at least two adjacent blocking elements enclose at least one rung of the ladder cord.

4. The operating device according to claim 1, wherein at least one blocking element is positioned between two adjacent rungs of the ladder cord.

5. The operating device according to claim 1, wherein at least one blocking element encloses at least part of at least one ladder cord.

6. The operating device according to claim 1, wherein at least one blocking element is attached to at least one pull cord and to at least one ladder cord.

7. The operating device according to claim 1, wherein at least part of at least one blocking element is flexible.

8. The operating device according to claim 1, wherein at least part of at least one blocking element is rigid.

9. The operating device according to claim 1, wherein at least part of at least one blocking element pierces through at least one pull cord.

10. The operating device according to claim 1, wherein at least one blocking element encloses at least one pull cord.

11. The operating device according to claim 1, wherein at least one blocking element is made of the same material as the ladder cord and/or the pull cord.

12. The operating device according to claim 1, wherein at least one blocking element forms integral part of the pull cord.

13. The operating device according to claim 1, wherein at least part of at least one blocking element extends in a direction away from the longitudinal direction of the pull cord.

14. The operating device according to claim 1, wherein the connector is at least partially resilient.

15. The operating device according to claim 1, wherein at least part of the at least one sleeve comprises a braided structure.

16. The operating device according to claim 1, wherein the primary connector part comprises multiple outwardly extending protrusions.

17. An operating device for a window covering, comprising:

at least one carrying structure;

at least one pull cord directly or indirectly connected or connectable to a bottom rail of a window covering, wherein operating the pull cord enables lowering and/or raising of the bottom rail with respect to the carrying structure;

at least one lifting element configured for guiding the pull cord at least during lowering and/or raising the window covering;

at least one sleeve configured to at least partially enclose the at least one pull cord; and at least one connector for connecting the at least one sleeve to the carrying structure, wherein the operating device comprises a plurality of blocking elements, positioned along the length of the pull cord, which blocking elements cooperate between at least part of the pull cord and part of the window covering, such that movement of the pull cord relative to the window covering is restricted; and wherein the connector comprises a primary connector part and a secondary connector part wherein the sleeve is enclosed between the primary connector part and the secondary connector part.

* * * * *